United States Patent Office 3,398,204
Patented Aug. 20, 1968

3,398,204
ISOMERIZATION PROCESS
Robert W. Gallant, Plaquemine, La., assignor to The Dow Chemical Company, Midland, Mich., a corporation of Delaware
No Drawing. Filed Aug. 26, 1965, Ser. No. 482,890
9 Claims. (Cl. 260—654)

ABSTRACT OF THE DISCLOSURE

Isomerization of a cis-trihaloalkene to a trans-trihaloalkene by contacting the former in the vapor phase with a metal halide Friedel-Crafts catalyst at a temperature of at least 100° C.

---

This invention relates to a catalytic process for the isomerization of trihaloalkenes. More particularly, the present invention relates to the preparation of trans-trihaloalkenes from cis-trihaloalkenes by contacting the cis-trihaloalkene compounds with an active isomerization catalyst.

The isomerization reaction of the invention may be represented as follows:

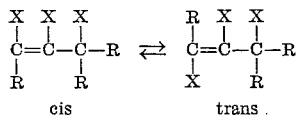

wherein each X is independently a halogen atom (chlorine, bromine, iodine or fluorine) and each R is independently selected from the group consisting of the hydrogen atom and a lower alkyl group of from 1 to 4 carbon atoms (methyl, ethyl, n-propyl, i-propyl, n-butyl, i-butyl, sec.-butyl and tert.-butyl). The active Friedel-Crafts catalysts which may be used to carry out this reaction include metal halides, especially copper and cadmium halides such as cuprous chloride, cuprous iodide, cuprous fluoride, cuprous bromide, cadmium chloride, cadmium bromide, cadmium fluoride and cadmium iodide. Cupric halides may also be employed, but are reduced to the cuprous state upon contact with the trihaloalkene compounds to be isomerized.

According to a specific embodiment of the process of the invention, a cis-1,2,3-trihaloalkene in the vapor phase is contacted with a metal halide (preferably a metal bromide or chloride) Friedel-Crafts catalyst such as a catalyst containing a copper halide, a cadmium halide or a mixture thereof, at a temperature of at least 100° C. (ordinarily from about 100° to 500° C.) for a time period sufficient to convert at least a portion of the cis-isomer to the corresponding trans-isomer. When the material to be isomerized is cis-1,2,3-trichloropropene, it is preferable to use cadmium chloride, cuprous chloride, or mixtures thereof, as catalysts. When mixed cis-trihalopropenes are isomerized (such as the isomerization of cis-1,2-dichloro-3-bromopropene to trans-1,2-dichloro-3-bromopropene), it is preferable to use either chlorides or bromides of metals such as copper and cadmium as catalysts. The process may be carried out with mixtures of cis- and trans-1,2,3-trihaloalkenes in order to obtain a final product richer in the trans-isomer than the original mixture. Other suitable catalysts include $SnCl_4$, $SnCl_2$, $TiCl_4$, $TiCl_3$, $AlCl_3$, $ZnCl_2$, $SbCl_3$, $NiCl_2$, $TiBr_4$, $TiBr_3$, $SnBr_2$, $SnBr_4$, $AlBr_3$, $ZnI_2$, etc. The concentration of the catalyst in the support may vary widely. An amount of from 5 to 25 percent by weight based on the total weight of the catalyst plus support is generally satisfactory. The concentration of active catalyst component in a given catalyst mixture may vary from about 1 percent up to 100 percent (i.e. no support material) depending upon the particular form of the catalyst mixture and the type of isomerization reactor employed. It is preferable to use a metal halide Friedel-Crafts catalyst in which the halogen moiety of the catalyst compound corresponds to at least one of the halogen atoms of the cis-trihalopropene, unless a simultaneous halogen interchange reaction between the catalyst and the reactants is desired. The preferred reaction temperatures are from about 150° to 250° C. The isomerization reaction may be carried out continuously (recycling reaction products to the reactor to obtain maximum conversion of cis- to trans-trihaloalkenes) or batchwise. When the process is operated batchwise, a residence time of from about 1 to 10 seconds per pass is sufficient to increase the amount of trans-isomer. Residence time is defined as the average time a molecule spends in the isomerization zone of the reactor.

The catalysts may be supported or unsupported and can be used in several physical forms (e.g., pellets, fine powder, granulated, etc.). It is generally preferable to use supported catalysts. Any inert support material may be employed. Suitable supports include porous siliceous materials (such as commercial firebrick and diatomaceous earth). Alumina may also be used as a support, or mixtures of various supports can be employed. Supported catalysts may be prepared by impregnating the support with the catalyst (usually by using an aqueous solution of the metal halide), drying the impregnated support material and then breaking the impregnated support into particles of any suitable size.

The following examples are submitted for the purpose of illustration only and are not to be construed as limiting the scope of the invention in any way.

GENERAL METHOD

Examples I–XIII

Vaporized cis-1,2,3-trichloropropene was passed through a reactor containing a packed catalyst bed. The reactor employed was a glass vessel two inches in diameter and ten inches in length. The retention time (average residence time) of feed material in the reactor was about 3 seconds.

The supported catalysts used in the reactor were: (1) cuprous chloride supported on finely ground firebrick (40 mesh size firebrick, U.S. Sieve Series), and (2) firebrick similarly impregnated with cadmium chloride. The catalyst materials were prepared by dissolving cuprous chloride or cadmium chloride in water to prepare a 50 percent by weight solution, mixing the solution with the crushed firebrick to form a paste, drying the paste at about 140° C. and then breaking the dried product into finely divided particles.

The results obtained were summarized in Table 1. The products from the reactor were analyzed by vapor phase chromatography. The feed composition of Examples I–X contained 97 percent by weight of cis-1,2,3-trichloropropene, 2 percent by weight of trans-1,2,3-trichloropropene and 1 percent by weight of 1,1,2,3-tetrachloropropane. The feed composition used in Examples XI–XIII contained 75 percent by weight of cis-1,2,3-trichloropropene, 20 percent by weight of trans-1,2,3-trichloropropene, 3 percent by weight of 2,3-dichloropropene-1 and 2 percent by weight of 1,1,2,3-tetrachloropropane (both of the latter two compounds were inert under the isomerization conditions). The conversion of the cis- to the trans-1,2,3-trichloropropene was calculated as follows:

Percent conversion =

$$\frac{\text{Grams of new product}}{\text{Grams of cis-1,2,3-trichloropropene fed}} \times 100$$

The yield was calculated as follows:

Percent yield to trans-1,2,3-trichloropropene =
$$\frac{\text{Grams of new trans-1,2,3-trichloropropene}}{\text{Grams of new product}} \times 100$$

TABLE 1

| Ex. No. | Reactor Temp. (° C.) | Catalyst composition | Percent conversion | Percent yield to trans-1,2,3-trichloropropene |
|---|---|---|---|---|
| I | 280 | 10% by weight CdCl₂ on firebrick. | 8 | 50 |
| II | 315 | do | 16 | 45 |
| III | 110 | 10% by weight CuCl on firebrick. | 3 | 100 |
| IV | 175 | do | 15 | 96 |
| V | 200 | do | 29 | 90 |
| VI | 240 | do | 46 | 67 |
| VII | 270 | do | 24 | 80 |
| VIII | 190 | do | 23 | 81 |
| IX | 220 | do | 35 | 75 |
| X | 245 | do | 44 | 66 |
| XI | 135 | do | 3 | 100 |
| XII | 195 | do | 11 | 90 |
| XIII | 240 | do | 18 | 75 |

I claim as my invention:

1. A method of isomerizing a cis-trihalo compound of the formula (a) 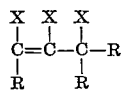

to a trans-trihalo compound of the formula (b) 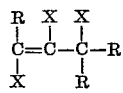

wherein each X independently represents a halogen atom and each R is independently a group of the formula $(C_kH_{2k})H$ wherein $k$ is an integer of from 0 to 4, which comprises contacting a compound of Formula (a) in the vapor phase with a metal halide Friedel-Crafts catalyst wherein the metal is copper, cadmium, tin titanium, aluminum, zinc, antimony or nickel at a temperature of from about 100° to 500° C.

2. The process of claim 1 wherein the metal halide Friedel-Crafts catalyst is a copper halide.

3. The method of claim 1 wherein the metal halide Friedel-Crafts catalyst is a cadmium halide.

4. A method of isomerizing cis-1,2,3-trichloropropene to trans-1,2,3-trichloropropene which comprises contacting vapors of cis - 1,2,3 - trichloropropene with cuprous chloride at a temperature of from about 100° to 500° C.

5. The method of claim 4 wherein the isomerization is carried out at a temperature of from 150° to 250° C.

6. A method of isomerizing cis-1,2,3-trichloropropene to trans-1,2,3-trichloropropene which comprises contacting cis-1,2,3-trichloropropene, in the vapor phase, with cadmium chloride at a temperature of from about 100° to 500° C.

7. The method of claim 6 wherein the isomerization is carried out at a temperature of from 150° to 250° C.

8. A method of isomerizing cis-1,2-dibromo-3-chloropropene to trans-1,2-dibromo - 3 - chloropropene which comprises contacting cis-1,2-dibromo-3-chloropropene in the vapor phase with cuprous bromide at a temperature of from 150° to 250° C.

9. A method of isomerizing a feed mixture containing:
 (a) cis-1,2,3-trichloropropene, and
 (b) trans-1,2,3-trichloropropene to obtain a final product in which the weight ratio of (b) to (a) is greater than said ratio in the original feed mixture which comprises contacting said feed mixture in the vapor phase with cuprous bromide at a temperature of at least 100° C.

References Cited

Crump, J.: J. Org. Chem., 28, 953–6 (1963).

LEON ZITVER, *Primary Examiner.*

J. A. BOSKA, *Assistant Examiner.*